(12) United States Patent
Kestler et al.

(10) Patent No.: US 11,421,547 B2
(45) Date of Patent: Aug. 23, 2022

(54) THERMAL-ANTI-ICING SYSTEM WITH MICROWAVE SYSTEM

(71) Applicant: Rohr, Inc., Chula Vista, CA (US)

(72) Inventors: Steven M. Kestler, San Diego, CA (US); Joseph V. Mantese, Ellington, CT (US)

(73) Assignee: Rohr, Inc., Chula Vista, CA (US)

( * ) Notice: Subject to any disclaimer, the term of this patent is extended or adjusted under 35 U.S.C. 154(b) by 272 days.

(21) Appl. No.: 16/735,152

(22) Filed: Jan. 6, 2020

(65) Prior Publication Data
US 2021/0207491 A1 Jul. 8, 2021

(51) Int. Cl.
*F01D 25/02* (2006.01)
*F01D 25/10* (2006.01)
*F02C 7/047* (2006.01)

(52) U.S. Cl.
CPC ............. *F01D 25/02* (2013.01); *F01D 25/10* (2013.01); *F02C 7/047* (2013.01); *F05D 2220/323* (2013.01)

(58) Field of Classification Search
CPC ......... B64D 15/00; B64D 15/04; F01D 25/02; F01D 25/10; F02C 7/047; F05D 2220/323
See application file for complete search history.

(56) References Cited

U.S. PATENT DOCUMENTS

| | | | |
|---|---|---|---|
| 4,365,131 A * | 12/1982 | Hansman, Jr. | B64D 15/14 219/703 |
| 5,061,836 A | 10/1991 | Martin | |
| 5,615,849 A * | 4/1997 | Salisbury | B64D 15/00 219/679 |
| 5,623,821 A * | 4/1997 | Bouiller | H05B 6/80 60/39.093 |
| 6,129,314 A * | 10/2000 | Giamati | B64D 15/00 244/134 A |
| 6,206,325 B1 * | 3/2001 | Nunnally | B64D 15/00 244/134 E |
| 6,207,940 B1 | 3/2001 | Feher | |
| 6,610,969 B2 * | 8/2003 | Feher | H05B 6/80 219/679 |
| 6,642,490 B2 | 11/2003 | Feher | |
| 6,787,744 B1 | 9/2004 | Feher | |
| 8,969,768 B2 * | 3/2015 | Kotzian | H05B 6/806 219/690 |

(Continued)

FOREIGN PATENT DOCUMENTS

| | | |
|---|---|---|
| CN | 109050938 | 12/2018 |
| EP | 3231252 B1 | 12/2018 |

OTHER PUBLICATIONS

EP search report for EP21150225.7 dated May 11, 2021.

(Continued)

*Primary Examiner* — Jesse S Bogue
(74) *Attorney, Agent, or Firm* — Getz Balich LLC

(57) ABSTRACT

An assembly is provided for an aircraft propulsion system. This aircraft propulsion system assembly includes an aircraft propulsion system and a microwave system. The aircraft propulsion system structure includes an exterior surface, an internal cavity and a susceptor thermally coupled to the exterior skin and within the internal cavity. The microwave system is configured to direct microwaves to the susceptor for melting and/or preventing ice accumulation on the exterior surface.

19 Claims, 8 Drawing Sheets

(56) References Cited

U.S. PATENT DOCUMENTS

| | | |
|---|---|---|
| 8,997,451 B2 | 4/2015 | Dufresne De Virel |
| 9,056,684 B2 | 6/2015 | McCollough |
| 2015/0083863 A1* | 3/2015 | Karthauser ............ B64D 15/00 244/134 D |
| 2016/0230774 A1* | 8/2016 | Whitehurst ............. F01D 5/147 |
| 2017/0057618 A1 | 3/2017 | Khozikov |
| 2019/0118955 A1 | 4/2019 | Porte |
| 2019/0160803 A1* | 5/2019 | Evens .................... B32B 3/266 |
| 2020/0165972 A1* | 5/2020 | Zebian ................... F02K 3/115 |
| 2021/0129997 A1* | 5/2021 | Kestler ................. B64D 15/00 |

OTHER PUBLICATIONS

Akinyemi et al., "Design and Development of a 2.4 GHz Slot Antenna", The Pacific Journal of Science and Technology, vol. 18, No. 2, Nov. 2017.

Dan Viza, "Modernizing RF and Microwave Power Applications", Freescale Technology Forum 2014, http://cache.freescale.com/files/training/doc/ftf/2014/FTF-IND-F0408.pdf.

Glenn Oliver, "Low-Loss Materials in High Frequency Electronics and the Challenges of Measurement", Feb. 4, 2015, https://wiki.epfl.ch/thz/documents/Materials%20and%20Measurements%20-%20DuPont%20-%20Feb2015.pdf.

Harbour Industries, "RF Microwave Coaxial Cable", https://www.iewc.com/-/media/iewcglobal/files/literature/us/manufacturers/harbour-industries/rf-microwave-coax-cable-catalog.pdf.

\* cited by examiner

THERMAL-ANTI-ICING SYSTEM WITH MICROWAVE SYSTEM

BACKGROUND

1. Technical Field

This disclosure relates generally to an aircraft system and, more particularly, to a thermal anti-icing system for an aircraft propulsion system.

2. Background Information

An aircraft propulsion system may include a thermal anti-icing system for melting ice accumulation on an inlet lip of a nacelle. Various thermal anti-icing systems are known in the art, which known systems include hot air systems and electrical resistance systems. While these known thermal anti-icing systems have various benefits, there is still room in the art for improvement. For example, routing a bleed duct for a typical hot air system into an internal cavity within the inlet lip may leave the nacelle open to a burst duct condition. In addition, the bleed duct and associated valves may be relatively heavy and, thus, increase overall propulsion system weight. In another example, in the case of an electrical resistance system, if a portion of a thermal blanket is damaged from, for example, a foreign object impact, that portion of the thermal blanket or, in some cases, the entire thermal blanket may become inoperable. There is a need in the art therefore for an improved thermal anti-icing system for an aircraft propulsion system.

SUMMARY OF THE DISCLOSURE

According to an aspect of the present disclosure, an assembly is provided for an aircraft propulsion system. This aircraft propulsion system assembly includes a nacelle structure and a thermal anti-icing system. The nacelle structure extends circumferentially about a centerline. The nacelle structure includes an exterior skin and an internal cavity. The thermal anti-icing system includes a susceptor and a microwave system. The susceptor is thermally coupled to the exterior skin within the internal cavity. The microwave system is configured to direct microwaves to the susceptor for melting and/or preventing ice accumulation on the exterior skin.

According to another aspect of the present disclosure, an assembly is for an aircraft propulsion system. This aircraft propulsion system assembly includes an aircraft propulsion system structure and a thermal anti-icing system. The aircraft propulsion system structure extends circumferentially about an axial centerline. The aircraft propulsion system structure includes an exterior skin, a first internal cavity and a second internal cavity discrete from and axially aft of the first internal cavity. The first internal cavity is partially formed by the exterior skin. The thermal anti-icing system includes a susceptor, a microwave source and a waveguide. The susceptor is within the first internal cavity and mounted to the exterior skin. The microwave source is within the second internal cavity and is configured to generate microwaves. The waveguide is configured to receive the microwaves from the microwave source and then direct the microwaves to the susceptor for melting and/or preventing ice accumulation on the exterior skin.

According to still another aspect of the present disclosure, an assembly for an aircraft propulsion system. This aircraft propulsion system assembly includes an aircraft propulsion system structure and a microwave system. The aircraft propulsion system structure includes an exterior surface, an internal cavity and a susceptor thermally coupled to the exterior skin and within the internal cavity. The microwave system is configured to direct microwaves to the susceptor for melting and/or preventing ice accumulation on the exterior surface. The microwave system may include a coax transmission line waveguide and/or a solid state microwave source.

The aircraft propulsion system structure may be configured as or otherwise include or be included in a nacelle inlet structure. The nacelle inlet structure may include the exterior skin.

The exterior skin may at least partially form an inlet lip of the nacelle structure. The susceptor may be mounted to the inlet lip.

The exterior skin may at least partially form an inner lip skin of the nacelle structure. The susceptor may be mounted to the inner lip skin.

The exterior skin may at least partially form an outer lip skin of the nacelle structure. The susceptor may be mounted to the outer lip skin.

The susceptor may be mounted directly on an interior surface of the exterior skin.

The assembly may also include a dielectric isolator. The susceptor may be mounted to an interior surface of the exterior skin through the dielectric isolator.

The susceptor may be configured as or otherwise include a layer of metal.

The metal may be or include aluminum.

The exterior skin may have a first thickness. The susceptor may have a second thickness that is less than the first thickness.

The internal cavity may be at least partially formed by the exterior skin.

The microwave system may include a waveguide extending into the internal cavity. The waveguide may be configured to direct the microwaves to the susceptor.

The microwaves may be transmitted at a frequency between one gigahertz (1 GHz) and ten gigahertz (10 GHz).

The microwave system may be configured to generate the microwaves in pulses.

The microwave system may include a coax transmission line waveguide.

The microwave system may include a waveguide. The waveguide may be or include a fluoropolymer.

The microwave system may include a microwave source configured as a magnetron, a klystron, a gyrotron or a solid state source.

The microwave system may include a microwave source and a waveguide. The microwave source may be located within a second internal cavity of the nacelle structure that is discrete from and located aft of the internal cavity. The waveguide may be configured to receive the microwaves from the microwave source and then direct the microwaves to the susceptor.

The foregoing features and the operation of the invention will become more apparent in light of the following description and the accompanying drawings.

DETAILED DESCRIPTION

Figure 1:
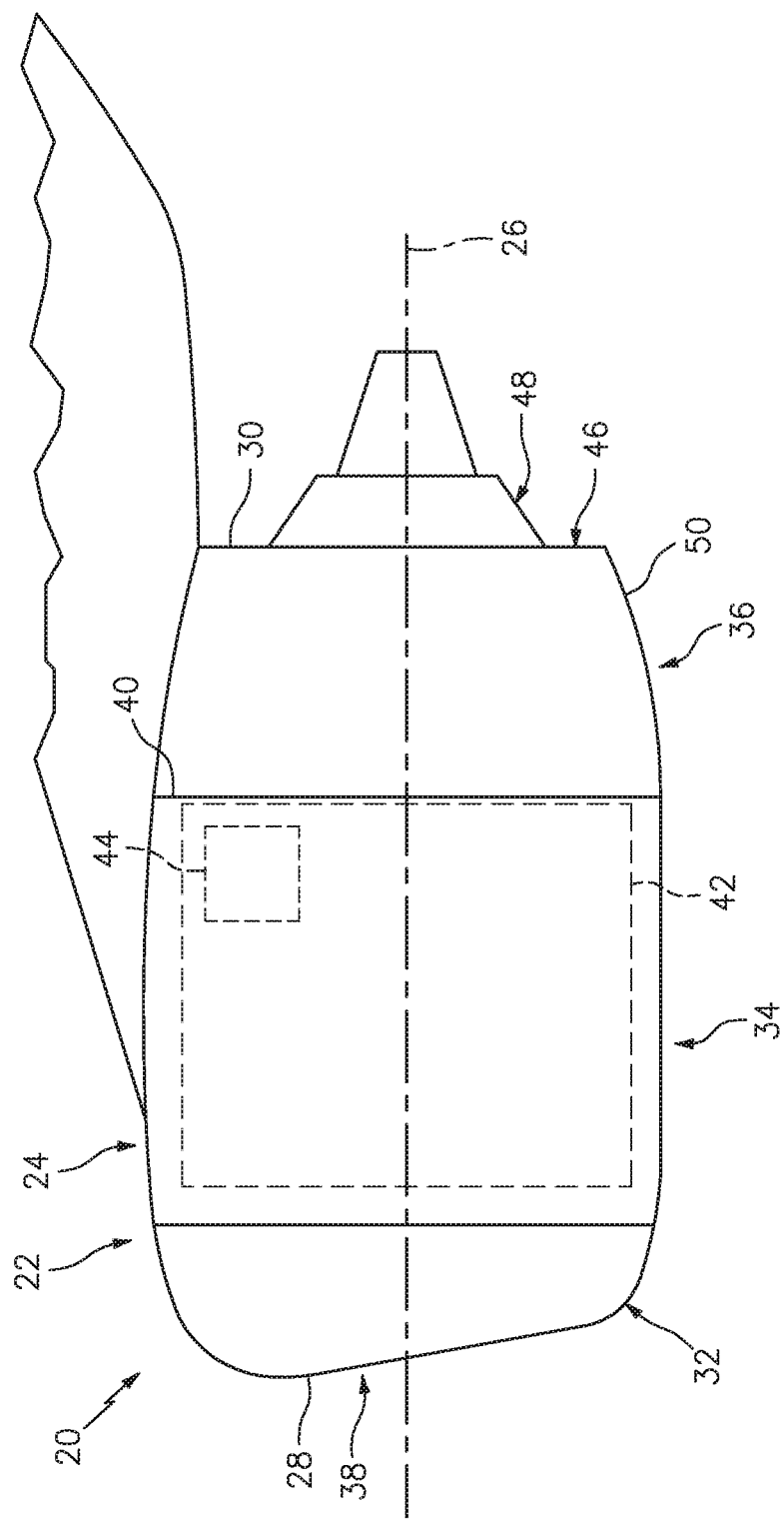
FIG. 1 is a side illustration of an aircraft propulsion system.

FIG. 1 illustrates an aircraft propulsion system 20 for an aircraft such as, but not limited to, a commercial airliner or a cargo plane. The propulsion system 20 includes a nacelle 22 and a gas turbine engine. This gas turbine engine may be configured as a high-bypass turbofan engine. Alternatively, the gas turbine engine may be configured as any other type of gas turbine engine capable of propelling the aircraft during flight.

The nacelle 22 is configured to house and provide an aerodynamic cover for the gas turbine engine. An outer nacelle structure 24 of the nacelle 22 extends along an axial centerline 26 of the gas turbine engine between a nacelle forward end 28 and a nacelle aft end 30. The nacelle structure 24 of FIG. 1 includes a nacelle inlet structure 32, one or more fan cowls 34 (one such cowl visible in FIG. 1) and a nacelle aft structure 36, which may be configured as part of or include a thrust reverser system.

As described below in further detail, the inlet structure 32 is disposed at the nacelle forward end 28. The inlet structure 32 is configured to direct a stream of air through an inlet opening 38 (see also FIG. 2) at the nacelle forward end 28 and into a fan section of the gas turbine engine.

The fan cowls 34 are disposed axially between the inlet structure 32 and the aft structure 36. Each fan cowl 34 of FIG. 1, in particular, is disposed at an aft end 40 of a stationary portion of the nacelle 22, and extends forward to the inlet structure 32. Each fan cowl 34 is generally axially aligned with a fan section of the gas turbine engine. The fan cowls 34 are configured to provide an aerodynamic covering for a fan case 42, which circumscribes the fan section and may partially form an outer peripheral boundary of a bypass flowpath of the propulsion system 20.

The term "stationary portion" is used above to describe a portion of the nacelle 22 that is stationary during propulsion system operation (e.g., during takeoff, aircraft flight and landing). However, the stationary portion may be otherwise movable for propulsion system inspection/maintenance; e.g., when the propulsion system 20 is non-operational. Each of the fan cowls 34, for example, may be configured to provide access to components of the gas turbine engine such as the fan case 42 and/or peripheral equipment (e.g., a microwave source 44) configured therewith for inspection, maintenance and/or otherwise. In particular, each of the fan cowls 34 may be pivotally mounted with the aircraft propulsion system 20 by, for example, a pivoting hinge system.

The present disclosure, of course, is not limited to the foregoing fan cowl configurations and/or access schemes.

The aft structure 36 of FIG. 1 is disposed at the nacelle aft end 30. The aft structure 36 is configured to form a bypass nozzle 46 for the bypass flowpath with an inner nacelle structure 48 of the nacelle 22; e.g., an inner fixed structure (IFS). The aft structure 36 may include one or more translating sleeves 50 (one such sleeve visible in FIG. 1) for the thrust reverser system. The present disclosure, however, is not limited to such a translatable sleeve thrust reverser system, or to an aircraft propulsion system with a thrust reverser system.

Figure 2:
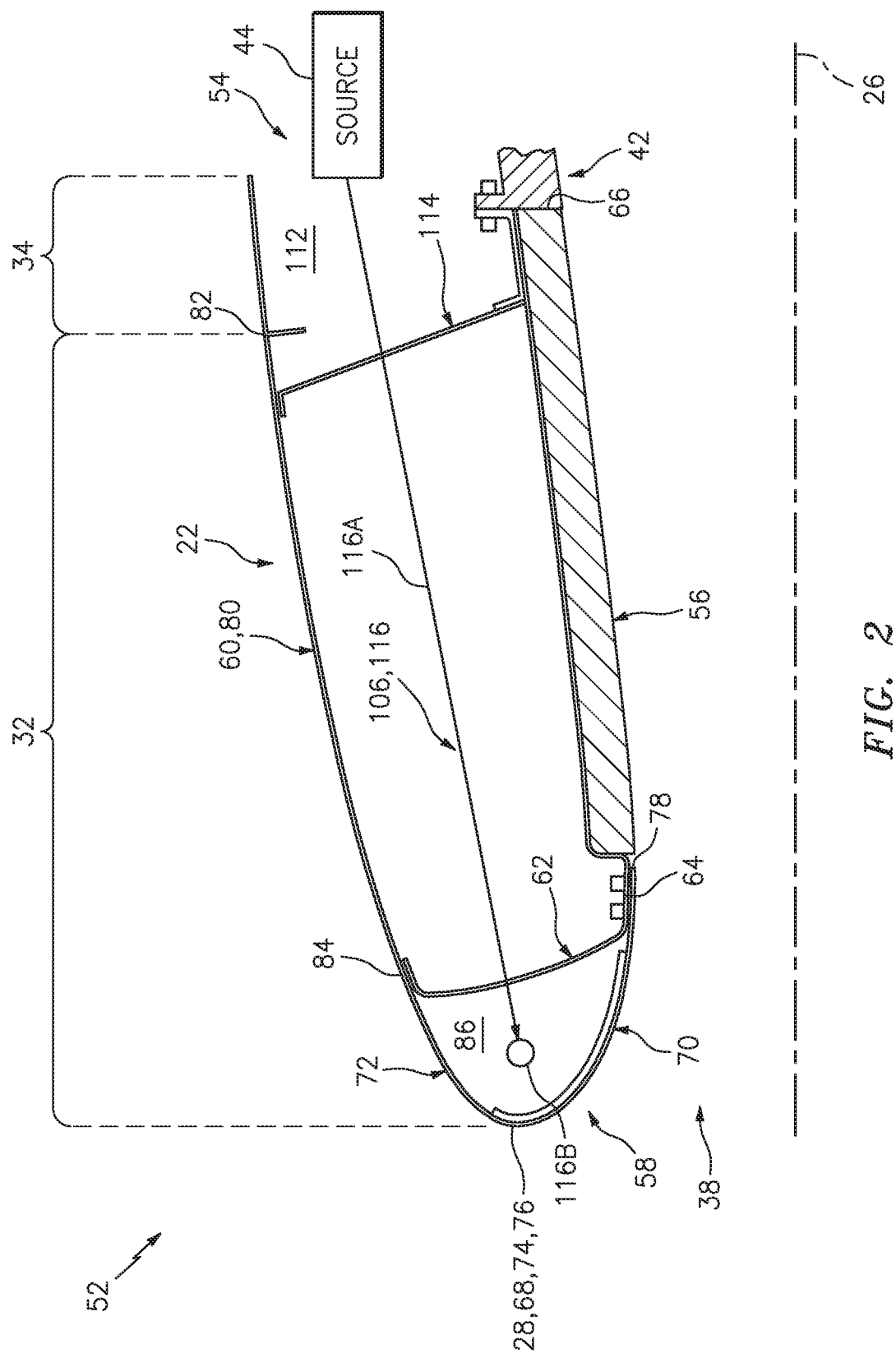
FIG. 2 is a partial side sectional illustration of an assembly for the aircraft propulsion system.

FIG. 2 is a schematic side sectional illustration of an assembly 52 of the propulsion system 20 of FIG. 1. This propulsion system assembly 52 includes the inlet structure 32, the fan cowls 34 (one shown) and the fan case 42. The propulsion system assembly 52 also includes a thermal anti-icing system 54.

The inlet structure 32 in FIG. 2 includes a tubular inner barrel 56, an annular inlet lip 58 (e.g., nose lip), a tubular outer barrel 60 and at least one forward (e.g., annular) bulkhead 62. The inlet structure 32 of FIG. 2 also configured with one or more components of the thermal anti-icing system 54.

The inner barrel 56 extends circumferentially around the axial centerline 26. The inner barrel 56 extends axially along the axial centerline 26 between an inner barrel forward end 64 and an inner barrel aft end 66. The inner barrel 56 may be configured to attenuate noise generated during propulsion system operation and, more particularly for example, noise generated by rotation of a fan in the fan section. The inner barrel 56 of FIG. 2, for example, includes at least one tubular acoustic panel or an array of arcuate acoustic panels arranged around the axial centerline 26. Each acoustic panel may include a porous (e.g., honeycomb) core bonded between a perforated face sheet and a non-perforated back sheet, where the perforated face sheet faces radially inward and provides an outer boundary for an axial portion of the gas path. Of course, various other acoustic panel types and configurations are known in the art, and the present disclosure is not limited to any particular ones thereof.

The inlet lip 58 forms a leading edge 68 of the nacelle 22 as well as the inlet opening 38 to the fan section of the gas turbine engine. The inlet lip 58 has a cupped (e.g., generally U-shaped) cross-sectional geometry, which extends circumferentially as an annulus around the axial centerline 26. The inlet lip 58 includes an inner lip skin 70 and an outer lip skin 72, which skins 70 and 72 may (or may not) be formed together from a generally contiguous sheet material. The sheet material may be constructed from metal such as, but not limited to, aluminum (Al) or titanium (Ti). The present disclosure, however, is not limited to the foregoing exemplary materials.

The inner lip skin 70 extends axially from an intersection 74 with the outer lip skin 72 at the nacelle forward end 28 to the inner barrel 56, which intersection 74 may be at an axially forwardmost point 76 (e.g., a flow stagnation point) on the inlet lip 58. An aft end 78 of the inner lip skin 70 is attached to the forward end 64 of the inner barrel 56 with, for example, one or more fasteners; e.g., rivets, bolts, etc. The inner lip skin 70 may also or alternatively be bonded (e.g., welded, brazed, adhered, etc.) to the inner barrel 56. Of course, the present disclosure is not limited to any particular attachment techniques between the inlet lip 58 and the inner barrel 56.

The outer lip skin 72 extends axially from the intersection 74 with the inner lip skin 70 at the nacelle forward end 28 to the outer barrel 60.

The outer barrel 60 has a tubular outer barrel skin 80 that extends circumferentially around the axial centerline 26. The outer barrel skin 80 extends axially along the axial centerline 26 between the inlet lip 58 and, more particularly, the outer lip skin 72 and an aft end 82 of the outer barrel 60.

The outer barrel 60 and its skin 80 may be formed integrally with the outer lip skin 72 and, more particularly, the entire inlet lip 58 as shown in FIG. 2. The inlet lip 58 and the outer barrel 60, for example, may be formed from a monolithic exterior skin such as, for example, a formed piece of sheet metal. Such a monolithic exterior skin may extend longitudinally from the aft end 78 of the inner lip skin 70 to the aft end 82 of the outer barrel 60. This monolithic exterior skin therefore integrally includes the inner lip skin 70, the outer lip skin 72 as well as the outer barrel skin 80. In such embodiments, the monolithic skin may be formed as a full hoop body, or circumferentially segmented into arcuate (e.g., circumferentially extending) bodies which are attached in a side-by-side fashion circumferentially about the axial centerline 26. The present disclosure, however, is not limited to such exemplary configurations. For example, in other embodiments, the inlet lip 58 may be formed discrete from the outer barrel 60 where the outer lip skin 72 is discrete from the outer barrel skin 80. In such embodiments, the outer lip skin 72 may meet the outer barrel skin 80 at an interface with the forward bulkhead 62 at, for example, a point 84.

The forward bulkhead 62 is configured with the inlet lip 58 to form a forward internal cavity 86 (e.g., annular D-duct) within the inlet lip 58. The forward bulkhead 62 of FIG. 2, in particular, is axially located approximately at (e.g., proximate, adjacent or on) the aft end of the inlet lip 58. The forward bulkhead 62 may be configured as a substantially annular body, which may be continuous or circumferentially segmented. The forward bulkhead 62 is attached to and extends radially between the inner lip skin 70 and the outer lip skin 72. The forward bulkhead 62 may be mechanically fastened to the inlet lip 58 with one or more fasteners. The forward bulkhead 62 may also or alternatively be bonded and/or otherwise connected to the inlet lip 58.

Figure 3:
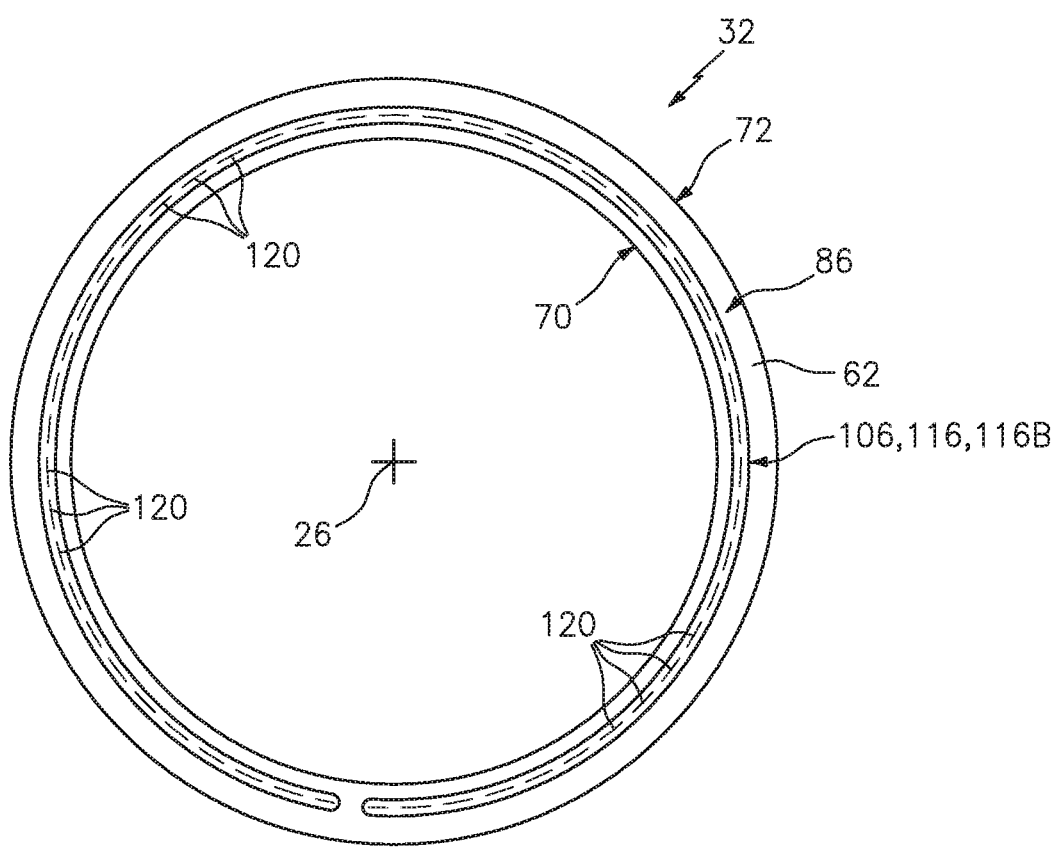
FIG. 3 is a cross-sectional illustration of the aircraft propulsion system assembly.

The forward internal cavity 86 extends axially within the inlet lip 58 from a forward end of the inlet lip 58 (e.g., at the point 76) to the forward bulkhead 62. The forward internal cavity 86 extends radially within the inlet lip 58 from the inner lip skin 70 to the outer lip skin 72. Referring to FIG. 3, the forward internal cavity 86 also extends circumferentially about (e.g., completely around) the axial centerline 26.

Figure 4:
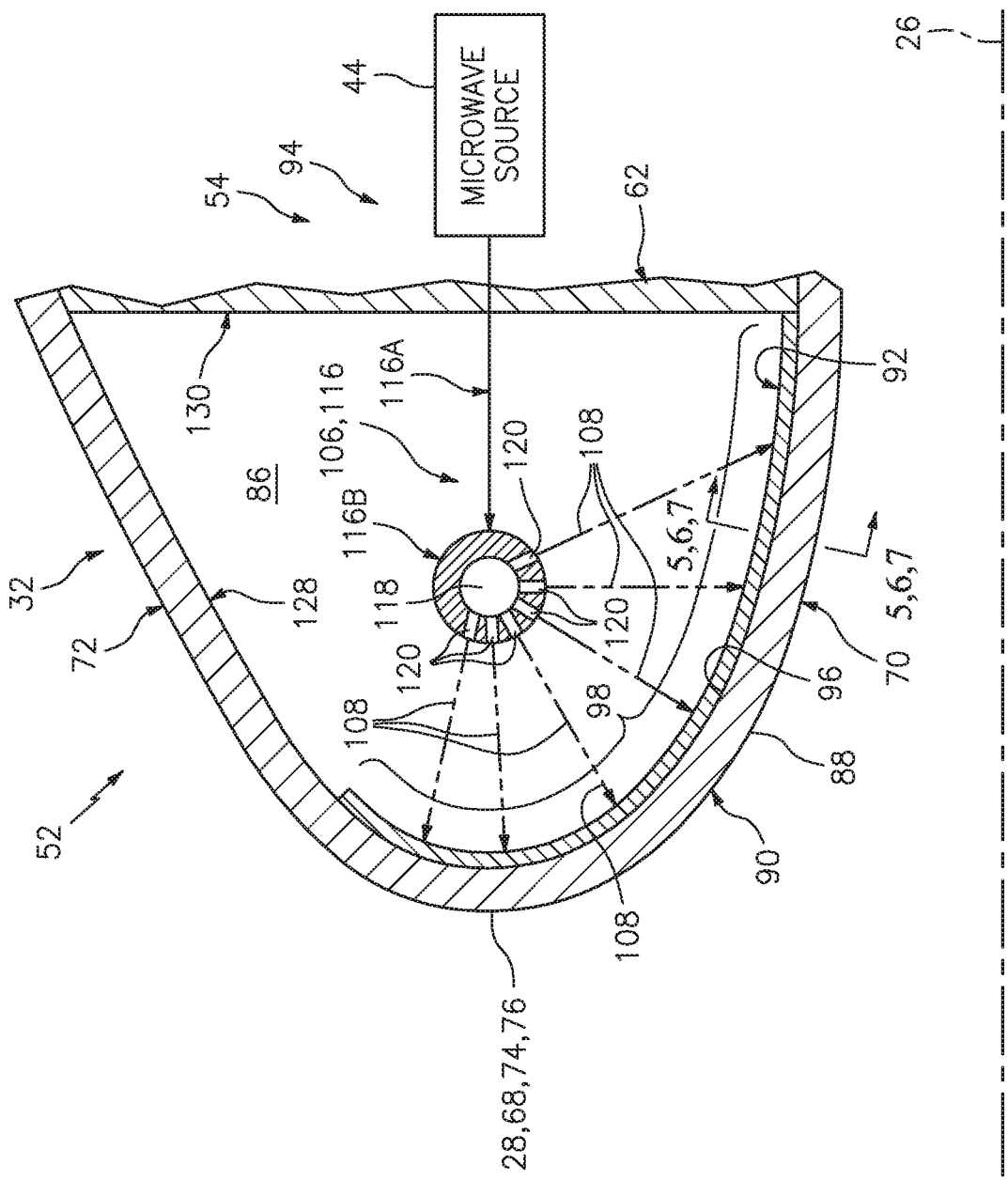
FIG. 4 is a partial side sectional illustration of a thermal anti-icing system for preventing and/or melting ice accumulation on an exterior skin.

Referring to FIG. 4, the thermal anti-icing system 54 is configured to melt and/or prevent ice accumulation on an exterior surface 88 of an exterior skin 90 of the inlet structure 32; e.g., exterior surfaces of the inner lip skin 70 and/or the outer lip skin 72. The thermal anti-icing system 54 of FIG. 4 includes at least one susceptor 92 and a microwave system 94.

The susceptor 92 is configured to absorb electromagnetic energy (e.g., microwave radiation) and convert that absorbed electromagnetic energy into heat. The susceptor 92, for example, may be configured as a thin layer of material. Examples of the susceptor material include, but are not limited to: aluminum (Al) or an alloy thereof; ferrous metal such as stainless steel; titanium (Ti) or an alloy thereof; Inconel alloys; chromium (Cr) or an alloy thereof; graphite; composites of metal(s) and ceramic(s) (e.g., cermets); doped silicon carbide; and/or metal oxide(s). The present disclosure, however, is not limited to the foregoing exemplary susceptor materials.

The susceptor 92 is thermally coupled to the exterior skin 90. The susceptor 92 of FIG. 4, for example, is mounted to an interior surface 96 of the exterior skin 90, which interior surface 96 is opposite the exterior surface 88. The susceptor 92 is configured to cover a (e.g., annular) region 98 of the interior surface 96. This covered region 98 may extend circumferentially about (e.g., completely around) the centerline 26. The covered region 98 may extend longitudinally along a portion (e.g., more than seventy to eighty percent (70-80%)) of a length of the inner lip skin 70 within the forward internal cavity 86; e.g., from the point 76 to or proximate the forward bulkhead 62. The covered region 98 may also (or alternatively) extend longitudinally along a portion (e.g., less than forty to fifty percent (40-50%)) of a length of the outer lip skin 72 within the forward internal cavity 86.

Figure 5:
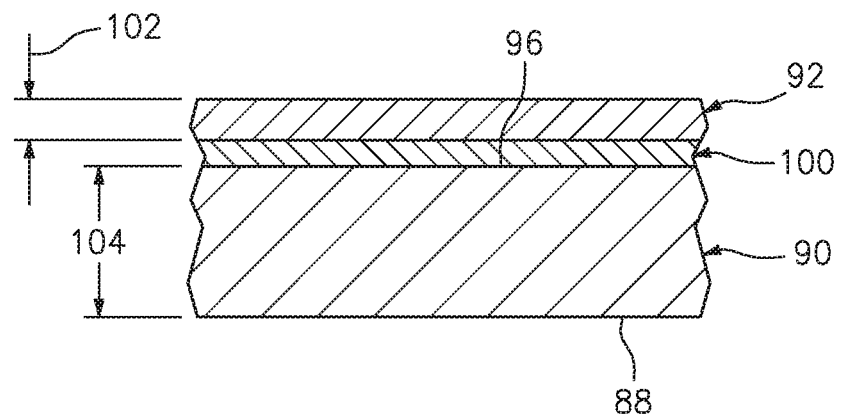
FIG. 5 is a sectional illustration of a wall section taken along line 5-5 in FIG. 4.

Referring to FIG. 5, the susceptor 92 may be mounted (e.g., bonded) indirectly to the exterior skin 90 through, for example, an isolator 100. This isolator 100 is configured to electrically isolate the susceptor 92 from the exterior skin 90, while still allowing thermal heat transfer from the susceptor 92 to the exterior skin 90. The isolator 100 of FIG. 5, for example, is a layer of dielectric material that (e.g., completely) physically separates, but thermally couples, the susceptor 92 and the exterior skin 90. The dielectric material may be or otherwise include a polymer (e.g., a fluoropolymer) such as, but not limited to, polytetrafluoroethylene (PTFE) (e.g., Teflon® material) or polyvinylidene fluoride (PVDF). The dielectric material may include fibrous material (e.g., glass fibers) within a polymer matrix. The dielectric material may also or alternatively include other polymeric materials and/or ceramics. For example, the dielectric material may include: alumina, silica, silicon carbide, silicon oxynitride, borosilicate glass, Pyrex, or other (e.g., "microwave safe") dielectrics used for conventional household microwave ovens. The present disclosure, however, is not limited to the foregoing exemplary dielectric materials. The present disclosure is also not limited to the foregoing mounting technique. For example, in the embodiment of FIG. 6, the susceptor 92 may be mounted (e.g., bonded) directly to the interior surface 96 of the exterior skin 90.

Figure 6:
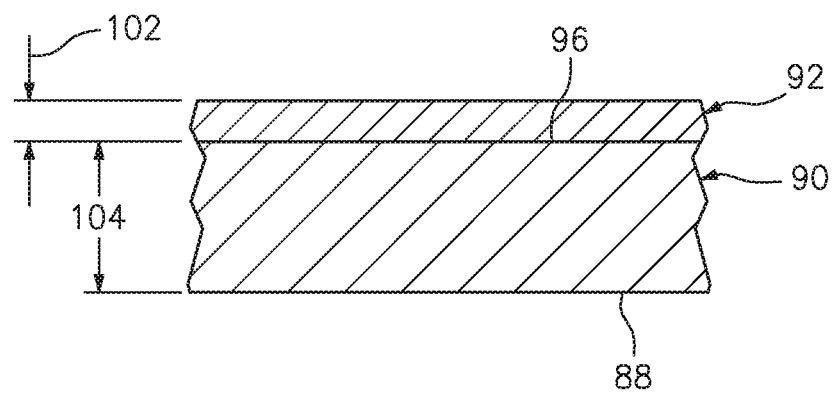
FIG. 6 is a sectional illustration of an alternative wall section taken along line 6-6 in FIG. 4.
Figure 7:
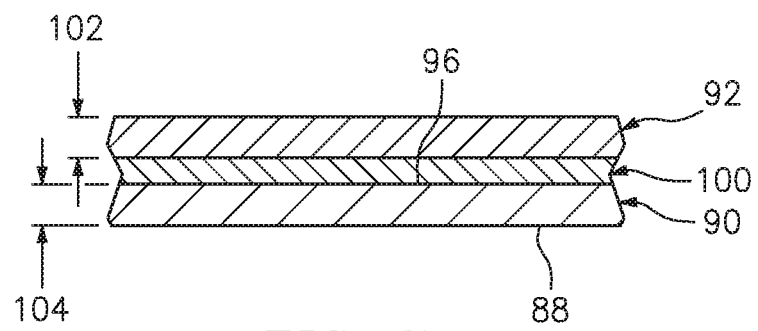
FIG. 7 is a sectional illustration of another alternative wall section taken along line 7-7 in FIG. 4.

Referring to FIGS. 5 and 6, the susceptor 92 has a susceptor thickness 102 that is sized less than a skin thickness 104 of the exterior skin 90. The present disclosure, however, is not limited to such an exemplary configuration. For example, in the embodiment of FIG. 7, the susceptor thickness 102 may be equal to the skin thickness 104. Generally speaking, the susceptor thickness 102 may be selected to be equal to a skin depth at a frequency of interest of the electromagnetic radiation. The susceptor thickness 102 may also or alternatively be selected to be one-quarter (¼) of a wavelength of the electromagnetic radiation at the frequency of interest.

In some embodiments, the susceptor 92 may be configured as a single, unitary layer and/or sheet of the susceptor material. In other embodiments, the susceptor 92 may include a plurality of susceptor segments. These susceptor segments may contact one another, or may be physically separated from one another by gaps in between.

Referring to FIG. 2, the microwave system 94 includes the microwave source 44 and a microwave transmission system 106. The microwave source 44 may be configured to generate microwaves 108 at a frequency of, for example, between 2.3 gigahertz (GHz) and 2.6 gigahertz; e.g., at exactly or about (e.g., +/−0.01 or 0.02) 2.45 gigahertz (GHz). Of course, in other embodiments, the microwave source 44 may generate the microwaves 108 at a frequency at or above 2.6 gigahertz. In still other embodiments, the microwave source 44 may generate the microwaves 108 at a frequency at or below 2.3 gigahertz. For example, the microwave source 44 may be configured to generate microwaves 108 at a frequency between one and ten gigahertz, or between one and three gigahertz, or between 2.2 and 2.7 gigahertz.

Figure 8:
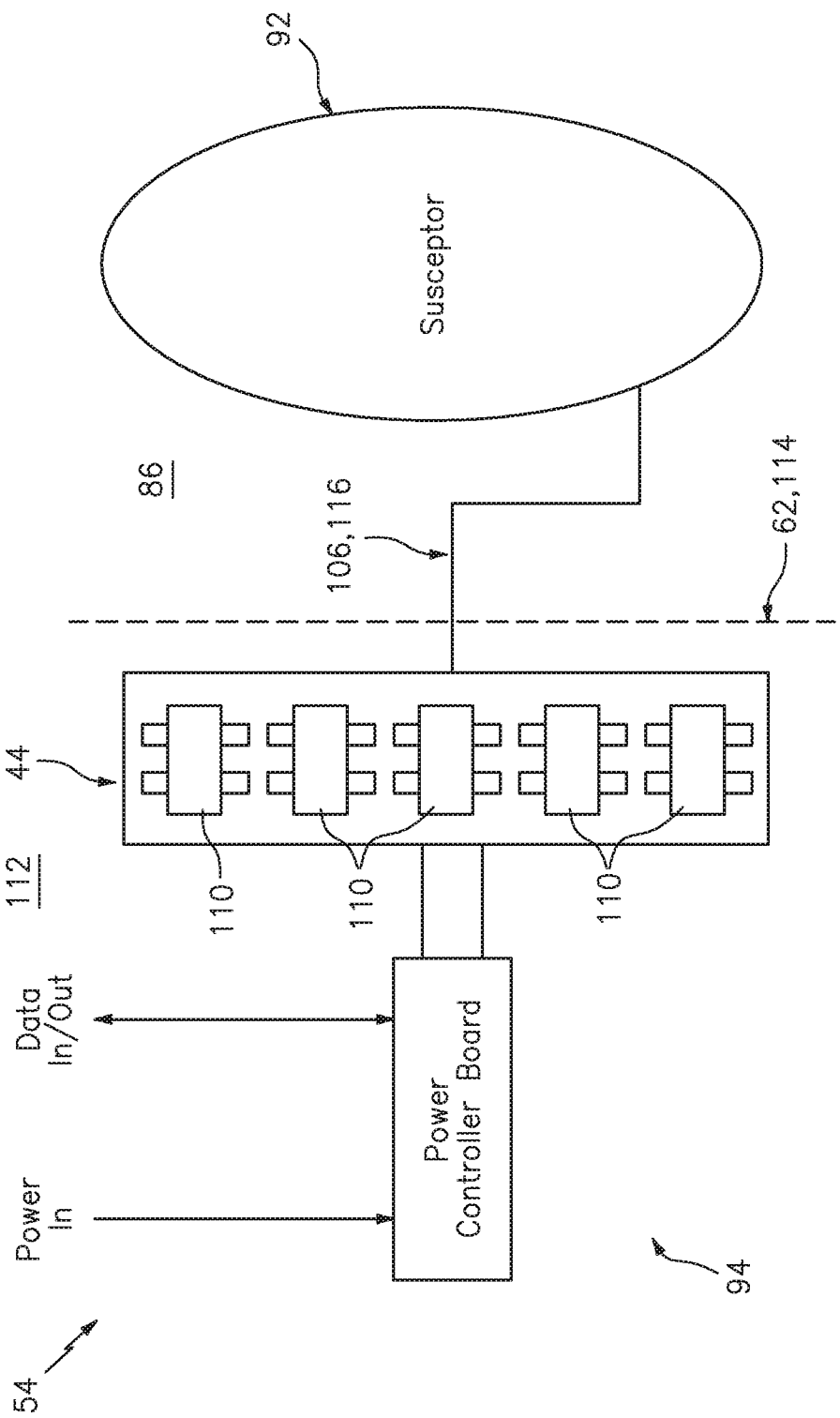
FIG. 8 is a schematic illustration of another aircraft propulsion system assembly.

The microwave source 44 may be configured as or otherwise include a vacuum electron device (VED) such as, but not limited to, a magnetron, a klystron and a gyrotron. The microwave source 44 may alternatively be configured as or otherwise include a solid state device; e.g., a solid state microwave source. Such a solid state device may include one or more radio-frequency (RF) transistors 110 configured to generate the microwaves 108 as shown, for example, in FIG. 8.

Generally speaking, a solid state device may have various advantages over a vacuum electron device. For example, a solid state device may require less (e.g., 10-100× less) operational power than a vacuum electron device; e.g., 20-50 volts versus 4000 volts. A solid state device may have a longer useful lifetime than a vacuum electron device; e.g., 15-20 plus years versus 500-1000 hours. A solid state device may have a lower mass and, thus, weigh less than a vacuum electron device. A solid state device may have improved control over a vacuum electron device.

In some embodiments, the microwave source 44 may be configured to generate a continuous output (e.g., stream) of the microwaves 108. In other embodiments, the microwave source 44 may be configured to generate an intermittent (e.g., pulsed) output of the microwaves 108.

The microwave source 44 may be arranged remotely from the susceptor 92. The microwave source 44, for example, may be arranged outside of the forward internal cavity 86 and aft of the forward bulkhead 62 along the centerline 26. With such an arrangement, the microwave source 44 may be located away from area(s) of the nacelle 22 which are more likely subject to damage during aircraft operation. The exterior skin 90 (see FIG. 4), for example, may be damaged by a foreign object (e.g., a bird) impact during aircraft operation. By locating the microwave source 44 outside and aft of the forward internal cavity 86, it is unlikely such a foreign object impact will damage the microwave source 44.

The microwave source 44 of FIG. 2 is located in a second internal cavity 112 of the nacelle 22. This second internal cavity 112 is axially separated from the forward internal cavity 86 by one or more intermediate structures; e.g., the forward bulkhead 62 and an aft bulkhead 114. The second internal cavity 112, for example, may be radially bound by at least a portion of the fan case 42 and at least a portion of one or more of the fan cowls 34. With such an arrangement, the microwave source 44 may be mounted to or proximate the fan case 42; e.g., see FIG. 1.

Referring to FIGS. 2 and 4, the microwave transmission system 106 is configured to transmit the microwaves 108 generated by the microwave source 44 to a desired location or locations within the nacelle 22 and, more particularly, within the inlet structure 32; e.g., within the forward internal cavity 86. The microwave transmission system 106 is further configured to selectively direct the microwaves 108 at/to the susceptor 92 as described below in further detail.

The microwave transmission system 106 is configured as or otherwise includes a microwave waveguide 116; e.g., an electromagnetic feed line. A first portion 116A of the microwave waveguide 116 is coupled to and is in communication with the microwave source 44. This microwave waveguide first portion 116A extends (e.g., axially along the centerline 26) from the microwave source 44 through the intermediate structures (e.g., 62 and 114) and to or into the forward internal cavity 86 where the microwave waveguide first portion 116A meets a second, downstream portion 116B of the microwave waveguide 116.

The microwave waveguide downstream portion 116B is arranged near the exterior skin 90. The microwave waveguide downstream portion 116B of FIG. 4, for example, is arranged at least partially (or completely) within the forward internal cavity 86. The microwave waveguide downstream portion 116B of FIG. 3 extends within the forward internal cavity 86 circumferentially about (e.g., completely around or nearly (e.g., 70-95%) around) the axial centerline 26. The microwave waveguide downstream portion 116B may be disposed radially and/or axially intermediately within the forward internal cavity 86 as shown in FIG. 4. With such a configuration, the microwave waveguide 116 and its downstream portion 116B may be physically separated from the exterior skin 90; e.g., disposed a non-zero distance away from the exterior skin 90.

The microwave waveguide 116 may include a tubular body with an internal passage 118 (e.g., bore) configured for communicating the microwaves 108 received from the microwave source 44.

The microwave waveguide 116 of FIGS. 3 and 4 and, more particularly, its second portion 116B includes one or more apertures 120; e.g., slots, slits and/or perforations. Each of these apertures 120 extends through/pierces a sidewall of the microwave waveguide 116. Each of these apertures 120 is thereby operable to direct the some of the microwaves 108 from within its internal passage 118 towards/to the susceptor 92.

Figure 9:
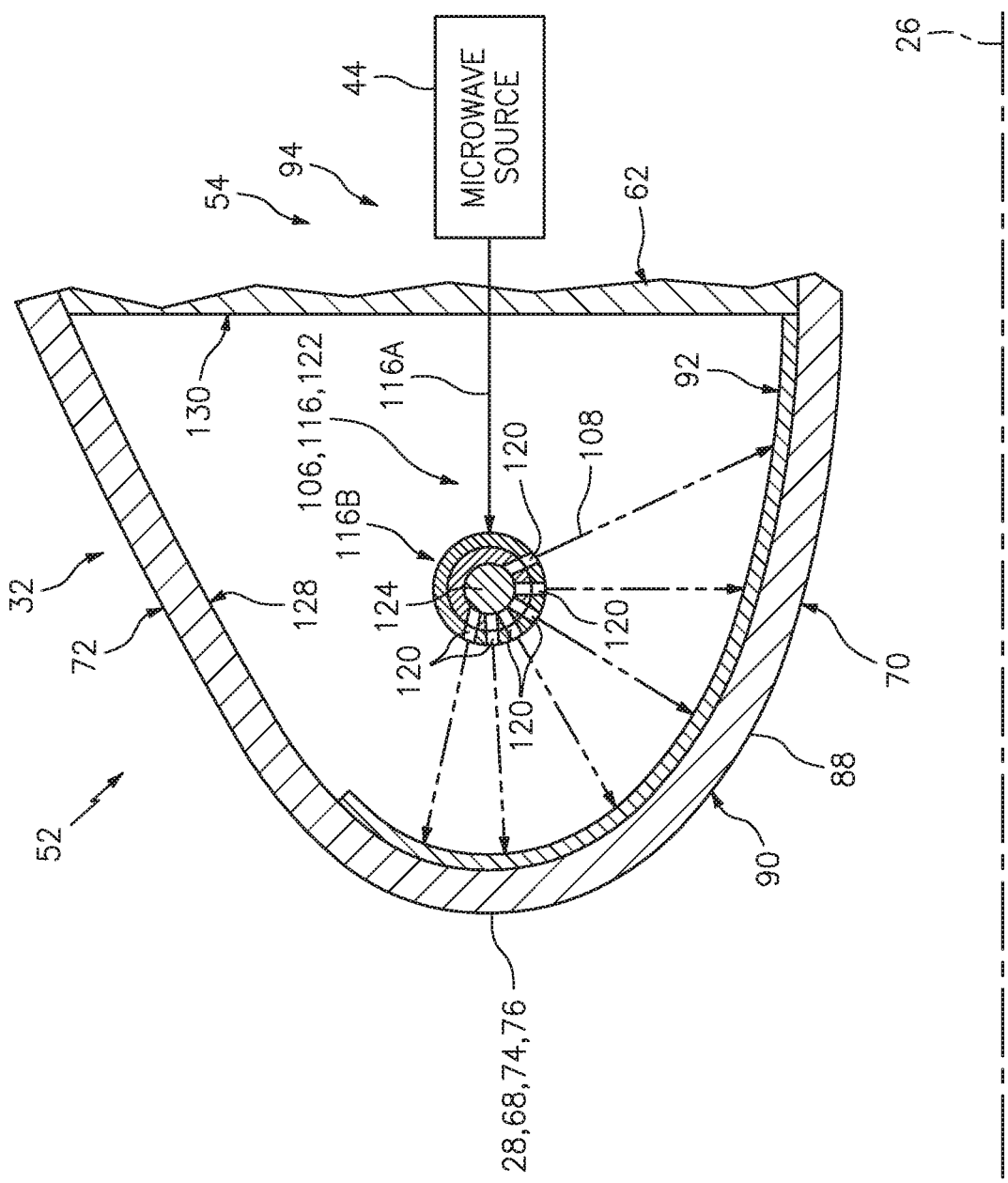
FIG. 9 is a partial side sectional illustration of the exterior skin and the thermal anti-icing system with an alternative microwave waveguide.
Figure 10:
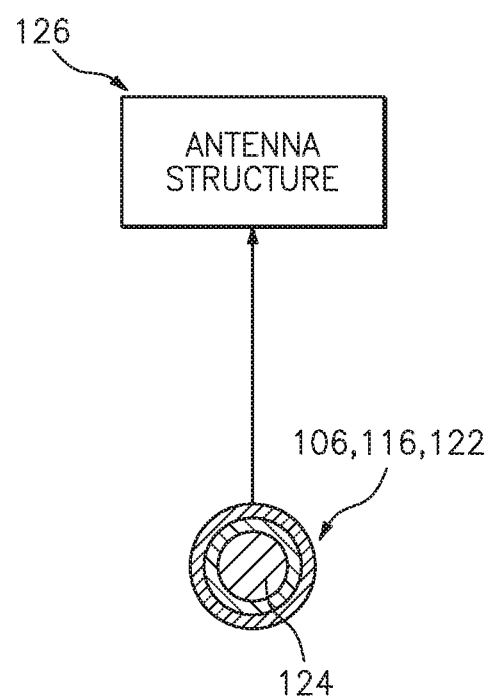
FIG. 10 is a block diagram of a waveguide in communication with an antenna structure.

Referring to FIG. 9, the microwave waveguide 116 may alternatively be configured as or otherwise include a dielectric waveguide 122. This dielectric waveguide 122 may include an insulated solid dielectric rod 124 for transmission of the microwaves 108 rather than an internal passage. Examples of such a dielectric waveguide 122 include, but are not limited to, an optical fiber, a microstrip, a coplanar waveguide, a stripline and a coaxial cable. The dielectric waveguide 122 may be constructed from or otherwise include a fluoropolymer such as, but not limited to, polytetrafluoroethylene (PTFE) (e.g., Teflon® material) or polyvinylidene fluoride (PVDF). The dielectric waveguide 122 may also or alternatively include other polymeric materials and/or ceramics. The dielectric waveguide 122 may include one or more of the apertures 120 for directing the microwaves 108 from the insulated solid dielectric rod 124 towards/to the susceptor 92. Alternatively, the dielectric waveguide 122 may be configured with (e.g., in microwave communication with) an antenna structure 126 (e.g., see FIG. 10), or with multiple of antenna structures 126. An example of the antenna structure 126 is a short metal stub operable to inject the microwaves 108 into a region at the susceptor 92. Other examples of the antenna structure 126 include, but are not limited to, a patch antenna and a directional antenna.

The tubular waveguide (see FIG. 4) and/or insulation for the dielectric waveguide 122 (see FIG. 9) may be constructed from or otherwise include a microwave resistive material such as, but not limited to, metal or alumina (e.g., $Al_2O_3$) or silica (e.g., $SiO_3$).

During operation of the thermal anti-icing system 54 of FIG. 4, the microwave source 44 generates the microwaves 108. These microwaves 108 are received by the microwave waveguide 116. The microwave waveguide 116 selectively directs the received microwaves 108 towards/to the susceptor 92. These transmitted microwaves 108 impinge against and are absorbed by the susceptor 92, and are then transformed by the susceptor 92 into thermal energy. This thermal energy may be transferred from the susceptor 92 into a region of the exterior skin 90 adjacent and/or proximate the susceptor 92. This transfer of the thermal energy may heat the region of the exterior skin 90 and thereby melt and/or prevent ice accumulation over and/or about the exterior skin region.

In some embodiments, one or more or all portions (e.g., 128) of the exterior skin 90 that are exposed to air within the forward internal cavity 86 (e.g., portions of the exterior skin 90 not covered by the susceptor 92) may be covered (e.g., coated) with reflective material. The reflective material is selected so as to reflect the microwaves 108 such that the microwaves 108 are only absorbed in the susceptor 92. Examples of the reflector material include, but are not limited to, any one or more of the aforementioned susceptor materials. However, by contrast to the susceptor, a thickness of the reflective material may be selected to be greater than a skin depth or wavelength of the electromagnetic radiation at the frequency of interest so as to be operable to reflect the electromagnetic radiation. One or more or all portions (e.g., 130) of the forward bulkhead 62 that are exposed to air within the forward internal cavity 86 may also or alternatively be covered (e.g., coated) with the reflective material. Of course, in other embodiments, the exposed portions (e.g., 128, 130) of the exterior skin 90 and/or the forward bulkhead 62 may be uncoated where, for example, the exterior skin material and/or the forward bulkhead 62 material does not absorb or absorbs a small amount of the microwaves 108.

The propulsion system assembly 52 of the present disclosure has various advantages. For example, in the case of a foreign object impact, the microwave source 44 may be remotely located away from the exterior skin 90 such that the source 44 is not damaged. In the event of such a foreign object impact, even if the susceptor 92 is cracked/fractured, the susceptor 92 may still be operable to transform the microwaves 108 into heat energy since no electrical interconnection is required. Provision of the microwave waveguide 116 versus a bleed duct may eliminate possibility of a burst duct condition. Provision of the relatively light susceptor 92 and waveguide 116 may reduce weight by obviating the need for ducting and valves associated with a traditional forced hot air anti-icing system.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:
   a nacelle structure extending circumferentially about a centerline, the nacelle structure comprising an exterior skin and an internal cavity;
   a thermal anti-icing system comprising a susceptor and a microwave system, the susceptor thermally coupled to the exterior skin within the internal cavity, and the microwave system configured to direct microwaves to the susceptor for melting and/or preventing ice accumulation on the exterior skin; and
   a dielectric isolator layer, the susceptor mounted to a surface of the exterior skin through the dielectric isolator layer.

2. The assembly of claim 1, wherein the exterior skin at least partially forms an inlet lip of the nacelle structure, and the susceptor is mounted to the inlet lip.

3. The assembly of claim 1, wherein the exterior skin at least partially forms an inner lip skin of the nacelle structure, and the susceptor is mounted to the inner lip skin.

4. The assembly of claim 1, wherein the exterior skin at least partially forms an outer lip skin of the nacelle structure, and the susceptor is mounted to the outer lip skin.

5. The assembly of claim 1, wherein the surface comprises an interior surface of the exterior skin.

6. The assembly of claim 1, wherein the susceptor comprises a layer of metal.

7. The assembly of claim 6, wherein the metal comprises aluminum.

8. The assembly of claim 1, wherein
   the exterior skin has a first thickness; and
   the susceptor has a second thickness that is less than the first thickness.

9. The assembly of claim 1, wherein the internal cavity is at least partially formed by the exterior skin.

10. The assembly of claim 1, wherein
    the microwave system comprises a waveguide extending into the internal cavity; and
    the waveguide is configured to direct the microwaves to the susceptor.

11. The assembly of claim 1, wherein the microwaves are transmitted at a frequency between one gigahertz (1 GHz) and ten gigahertz (10 GHz).

12. The assembly of claim 1, wherein the microwave system is configured to generate the microwaves in pulses.

13. The assembly of claim 1, wherein the microwave system includes a coax transmission line waveguide.

14. The assembly of claim 1, wherein the microwave system includes a waveguide comprising a fluoropolymer.

15. The assembly of claim 1, wherein the microwave system comprises a microwave source configured as a magnetron, a klystron, a gyrotron or a solid state source.

16. The assembly of claim 1, wherein
    the microwave system comprises a microwave source and a waveguide;
    the microwave source is located within a second internal cavity of the nacelle structure that is discrete from and located aft of the internal cavity; and
    the waveguide is configured to receive the microwaves from the microwave source and then direct the microwaves to the susceptor.

17. An assembly for an aircraft propulsion system, comprising:
    an aircraft propulsion system structure extending circumferentially about an axial centerline, the aircraft propulsion system structure comprising an exterior skin, a first internal cavity and a second internal cavity discrete from and axially aft of the first internal cavity, and the first internal cavity partially formed by the exterior skin; and
    a thermal anti-icing system comprising a susceptor, a microwave source and a waveguide, the susceptor within the first internal cavity and mounted to the exterior skin through a dielectric isolator layer, the microwave source within the second internal cavity and configured to generate microwaves, and the waveguide configured to receive the microwaves from the microwave source and then direct the microwaves to the susceptor for melting and/or preventing ice accumulation on the exterior skin.

18. The assembly of claim 17, wherein the aircraft propulsion system structure comprises a nacelle inlet structure; and the nacelle inlet structure comprises the exterior skin.

19. An assembly for an aircraft propulsion system, comprising:

an aircraft propulsion system structure comprising an exterior surface, an exterior skin, an internal cavity and a susceptor thermally coupled to the exterior skin and within the internal cavity, and the susceptor comprising a layer of metal; and a microwave system configured to direct microwaves to the susceptor for melting and/or preventing ice accumulation on the exterior surface, the microwave system comprising a coax transmission line waveguide and/or a solid state microwave source; and a dielectric isolator layer, the susceptor mounted to a surface of the exterior skin through the dielectric isolator layer.

* * * * *